Nov. 17 1925.

J. SHAW 1,562,066

METHOD OF PRODUCING MOTION PICTURES IN COLORS

Original Filed Oct. 19, 1920    2 Sheets-Sheet 1

INVENTOR
Joseph Shaw.
BY
*Emery Booney Blair & Hogust*
ATTORNEYS

Nov. 17, 1925.
J. SHAW
1,562,066
METHOD OF PRODUCING MOTION PICTURES IN COLORS
Original Filed Oct. 19, 1920   2 Sheets-Sheet 2
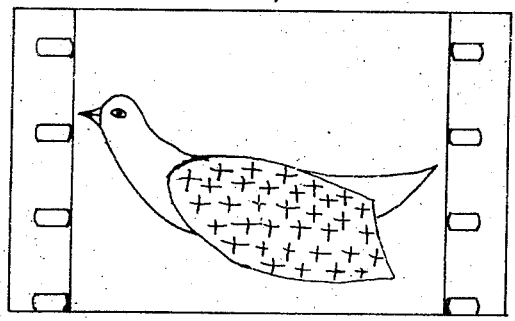
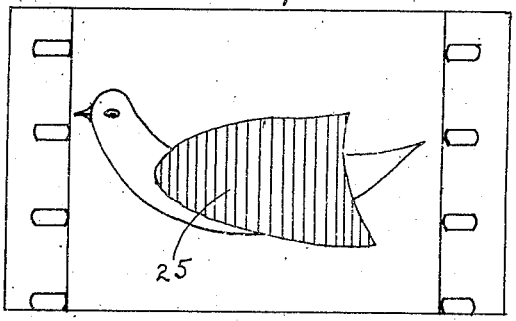
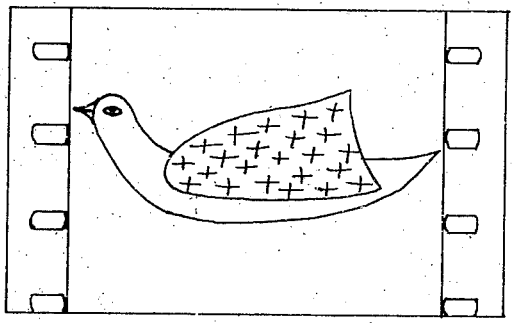
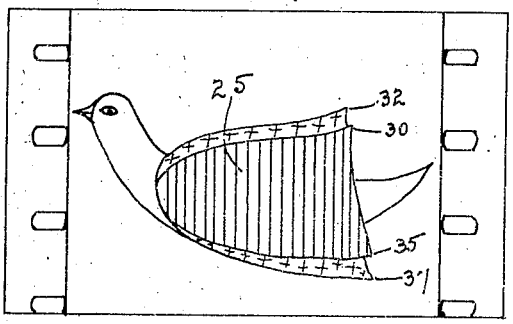
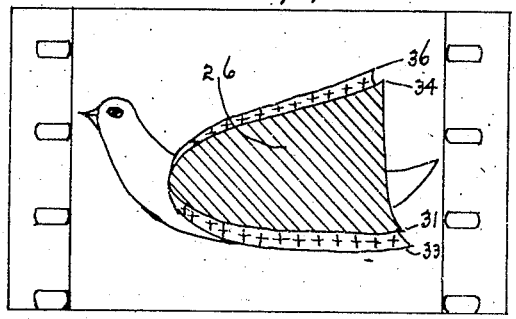
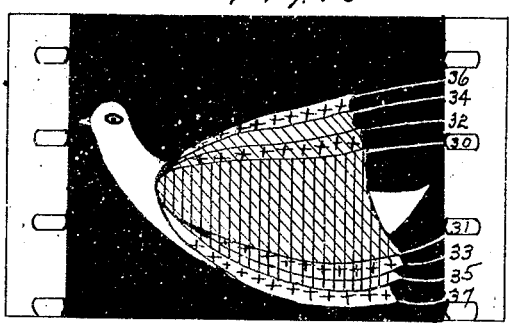
INVENTOR
Joseph Shaw
BY
ATTORNEY Patented Nov. 17, 1925.

1,562,066

UNITED STATES PATENT OFFICE.

JOSEPH SHAW, OF NEW YORK, N. Y., ASSIGNOR TO KINGDON GOULD AND SCHUYLER NEILSON RICE EXECUTORS OF THE WILL OF GEORGE J. GOULD, DECEASED.

METHOD OF PRODUCING MOTION PICTURES IN COLORS.

Application filed October 19, 1920, Serial No. 417,862. Renewed April 16, 1925.

*To all whom it may concern:*

Be it known that I, JOSEPH SHAW, a citizen of the United States, and a resident of the city of New York, county of Bronx, and State of New York, have invented an Improvement in Methods of Producing Motion Pictures in Colors, of which the following is a specification.

This invention relates to color photography and has for an object to provide an improved method of producing positives in colors adapted for motion picture reproduction.

The invention aims to obtain in the final projecting positive fine detailed images sufficiently brilliant in color to produce suitable color effect upon projection and at the same time to reduce the color fringe effect generally resulting in the type of color motion pictures, in which fast moving objects are photographed step by step by means of an ordinary one-lens camera and using suitable color filter means to cause successive images to be of different color selected values.

Color fringes are due to the displacement of the phase of action of one image with respect to the next. The width of a color fringe obviously depends in part upon the speed of the moving object with respect to the speed of taking of the picture. If complementary red and green color filters are employed in taking, the taking speed is limited by the limitation of sensitiveness of the panchromatic film, and this limitation of speed in taking, results on projection of the positive in wide and brilliantly colored fringes. If less dense non-complementary color filters be substituted for the complementary, the contrast of the color fringes will be subdued, but the general color effect of the picture will also be materially reduced.

The present invention combines the use in the taking camera of substantially complementary color filters with the use of non-complementary color filters in a manner to obtain sufficient exposure in taking and to retain the more brilliant color values for the major portion of each image area, while softening the intensity of the color of the edge portions of the area. This is accomplished by making the first and last portions of each exposure through an auxiliary color filter of different character from the two principal complementary color filters. Inasmuch as the object necessarily moves a certain distance during the period of exposure, if the first portion of the exposure and the last portion of the exposure are made through a different color filter, the edge portions (and therefore parts of the fringe-producing areas) are given their character by such filter. I prefer to select a color filter which is of a character intermediate that of the two principal complementary color filters employed and to use that filter for the first and last portions of all exposures.

Thus it will be seen that the edge portion of one image of one color value of one phase of action and the edge portion of the next successive image of another color value of the next successive phase of action is bearing non-complementary color values making these portions of both images more of a general character.

In the process herein more particularly described for the purposes of illustrating the invention, I have selected as principal filters complementary red and green, and for the auxiliary filter I have selected a yellow filter, preferably a deep yellow filter of the G. A. or G. M. type as described by Dr. C. E. Kenneth Mees, (see The Photography of Colored Objects, second edition, published by Eastman Kodak Co., page 44 et seq.) and manufactured by Wratten & Wainwright. The images of the negative may be classified for convenience as being divided into pairs, each pair comprising one successive color selected image of one of the two complementary color values and the yellow value, and one successive color selected image of the other complementary color and yellow value. One image of each pair is printed upon one side of a double coated positive film and the other image of the same pair is printed upon the other side of the positive film opposite and in registry with such first image. After the images are printed and developed the positive is treated by any suitable method, for instance, by bleaching and dyeing to produce the necessary colors. The side of the film on which occur the images of red color selected value is converted into a green or blue-green dye color and the other side on which occur the images of green color selected value is converted into a red or orange-red dye color. The positive is then ready for projection in an ordinary projector.

Referring to the accompanying drawing, Figure 1 is a diagrammatic representation showing in effect a combination shutter and filter.

Figures 5, 6, and 7 are diagrammatic views showing three different portions of a phase of action of a bird in flight. Figure 8 is a view showing the three phases combined in one image area. Figure 9 is a view similar to Figure 8 but showing the companion image of a pair of images taken through different color screens. Figure 10 is a diagrammatic view of a positive as printed from the negative shown diagrammatically in Figures 8 and 9.

Figure 1:
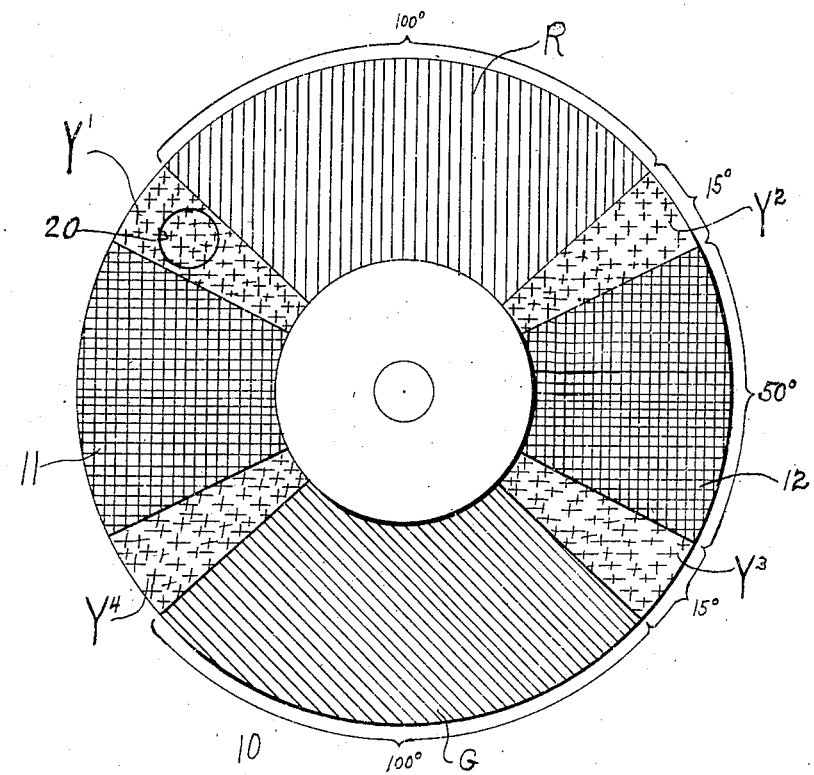

The combined shutter and filter 10 Fig. 1 comprises the opaque shutter areas 11 and 12, the red color filter area R and the green color filter area G, together with the auxiliary filter areas $Y^1$, $Y^2$, $Y^3$, $Y^4$, all of deep yellow quality, as above explained.

In the illustrative process to be described a negative is exposed substantially as follows: The shutter and filter mechanism diagrammatically illustrated in Fig. 1 is operated in synchronism with the film moving means. The first image area is exposed through the three filter areas $Y^1$, R, $Y^2$. The second image area is exposed through the three filter areas $Y^3$, G, $Y^4$ and so on.

Figure 3:
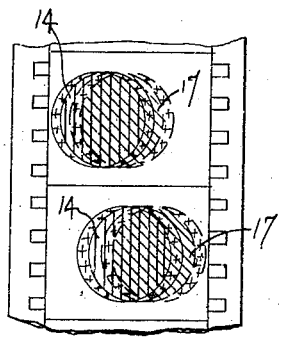
Fig. 3 is a section of a double coated positive film printed from the negative of Fig. 2 showing the images of different color selected value superimposed upon opposite sides of the film as the same appear before the dyeing of the positive. The object may, for example, be white showing against a gray background.
Figure 4:
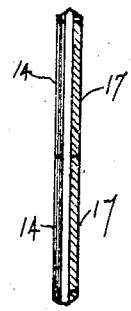
Figure 4 is a sectional view of the film.

The major portions of the alternate images 14, 14 of a moving object thus produced will be of a predominating red color selected value, whereas the edge portions 15, 16 thereof will be of a yellow color selected value. The other image areas 17, 17 will be exposed through the filter areas $Y^3$, G and $Y^4$. In the latter images the green color selected value will predominate except at the edges 18, 19, where yellow color selected value will occur. In printing the positive from the negative thus produced, the first two image areas 14, 17 will be superimposed, preferably one image area being printed upon one side of the film and the other image area being printed upon the other side of the film. The two images of each pair will be, on the whole, in registry with each other, but the images of a moving object in the scene will overlap slightly due to the difference in phase of action recorded. This is indicated in Fig. 3 of the drawing by indicating the image of red color value 14 in full lines and the image 17 of green color value in dotted lines. One image is shown as laterally displaced with respect to the next to represent the images as they will appear upon the film. The overlapping area on each side will be the area which ordinarily would tend to cause color fringe effect. In the process of the present invention, however, a portion of this area will in each case be more of yellow color selected value because exposed through a yellow filter and therefore will be of less intense red or green quality. The distinctness of the color fringe upon projection will accordingly be reduced in proportion to the color relations of the filters and the relative widths of the different filters when suitably arranged. The images taken through the different screens and therefore representing different color values are differently cross-hatched to represent different color values, but obviously in the negative they will be represented in black and white.

The object photographed may be considered as of any suitable color in connection with the foregoing explanation. For convenience of description the object may be considered as of mixed red and green lines with or without other colors.

Another diagrammatical illustration of the effect of producing motion pictures in colors in accordance with the process herein described is illustrated conventionally in Figures 5 to 10 inclusive. For the purposes of illustration, we assume a bird in flight moving its wings very rapidly. For convenience of discussion, that portion of the movement which appears upon one image area is treated as divided into three phases of action. The first phase of action is exposed immediately upon the opening of the lens through the yellow section Y' of the revolving screen. The second phase of action is exposed through the red section R of the screen and the third phase is exposed through the yellow section $Y^2$. The three phases may be treated as reproduced on the negative as indicated in Figures 5, 6, and 7 respectively. Now it will be understood that all that is shown in these three figures is in fact photographed on one image area of the negative in superposed relation. The resultant combination is indicated in Figure 8 but in said figure that portion of the combined image which is shown in Figure 6 is indicated as of red color selected value and only the marginal portions are shown as of yellow color selected value. This indicates what as a matter of fact ordinarily occurs in practice. that in the central portion 25 of the image, which is of red color selected value, the red color selection so far dominates the picture that the yellow color selected value may be treated as disappearing or merging into the red color selected value.

Figure 2:
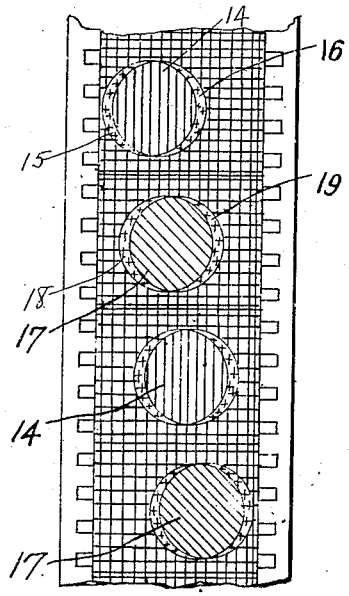
Fig. 2 is a section of a negative which has been exposed through the filter arrangement of Fig. 1.

The image shown in Figure 8 is the first of two images for convenience treated as a pair as heretofore discussed, this being the image of predominately red color selected value. It will be understood that the second image of the same pair will be of similar character, of predominately green color selected value with similar marginal portions of yellow color selected value. Such an image is shown in Figure 9 wherein the central portion 26 is indicated as of green color selected value. As previously explained these two images of a pair are printed in superposed relation on opposite sides of the positive film just as the two images 14 and 17 shown in the negative of Figure 2 were described as printed in superposed relation on opposite sides of the projection positive of the bird indicated in Figure 10. The side of the film on which occur the images of predominating red color selected value is converted into a green or blue green dyed color and the other side is converted into a red or orange red dyed color as previously explained.

Referring to Figure 10, the central portion of the image area extending vertically from the line 30 to line 31 combines, in the positive, portions of red and green color selected values correspondingly dyed as above explained. The portion extending from the line 30 to the line 32 in said figure combines on one side of the positive a part of the portion 26 of Figure 9 of green color selected value with, on the opposite side of the positive, a portion of the image of Figure 8 of yellow color selected value so that this portion of the image may be considered as combining portions respectively of green and yellow color selected values. Similarly the portion of the image extending from the line 31 to the line 33 combines portions of yellow and of red color selected values. The portion of the image area extending from the line 32 to the line 34 combines a portion of green color selected value with a portion of the background, and the portion between the lines 34 and 36 combines a portion of yellow color selected value with a portion of the background. It will be understood that when the image shown in Figure 10 produced as above explained when projected will show the displacement of the phase of action in less pronounced color and therefore will show less intense color fringe upon the screen.

It will be noted that all images are so taken as to provide marginal portions showing displacement fringe forming portions taken through the yellow filter and therefore whether appearing upon the red or green dyed side of the positive will be of the same color selected values. This provision whereby the portions which normally would produce fringes are of the same color selected value whether dyed red or green has a marked tendency to reduce the intensity of any fringes which occur.

The relative widths of the several filters and of the shutter and accordingly the relative periods of exposure and of closure of the shutter, and the relative lengths of time of exposure through each of the several filters can be adjusted as the requirements of use may require. In the example illustrated for the purposes of this specification the 360° representing the complete circle and corresponding to the period including two complete exposures is divided into two areas of 130°, each representing a period of exposure and two areas of 50°, each representing a period of closure of the shutter. Each of the exposure areas is again divided into areas of 100° representing the period of exposure through the corresponding principal filter and 15° on each side thereof representing the periods of exposure through the auxiliary filters. The yellow filter sections may be of a width such that for a brief interval during the exposure period the whole image will be projected through the yellow filter. This is indicated conventionally by showing the yellow sections as, for example, slightly wider than the diameter of the lens as indicated at 20 in the drawing.

I claim as my invention:

1. A method of producing motion picture negatives which comprises exposing successive image areas of a negative, through complementary color filters, and exposing each successive image area for a brief interval before and after each exposure through the respective complementary color filters, through a filter separating color values substantially intermediate the complementary color filters.

2. The method of producing motion picture color projecting-positives which comprises exposing image areas in pairs to record successive phases of action, one image area of each pair being exposed through deep yellow, red and deep yellow filters in succession and the other image area of each pair being exposed through deep yellow, green and deep yellow filters in succession, developing the image areas and printing and suitably coloring the images in pairs upon opposite sides of a transparent support, the two images of each pair being printed in superposed relation.

3. The method of producing motion picture color projection positives which comprises successive exposure of successive image areas to record successive phases of action in which each alternate or even numbered image area is exposed successively through yellow, red and yellow filters in succession, and each odd numbered image area is exposed through yellow, green and yellow filters in succession, developing the negative so produced and printing therefrom a positive by printing the successive images in pairs on a double-coated light sensitive support, the two successive images of each pair being printed in superposed relation, developing the positive and converting the two sets of images of color selected value into suitable dye colors.

4. The process as defined in claim 3, in which images of red color selected value are printed upon one side of a positive and images of green color selected value are printed upon the opposite side of the positive and the positive is given a red dye color on one side and a green dye color on the opposite side substantially as set forth.

5. The method of producing motion picture double-coated positives, which comprises imprinting pairs of successive images upon opposite sides of the film, each pair consisting of one imprinted image on one side and another upon the opposite side but in superposed relation thereto, characterized thereby that every picture area throughout the length of the film on both sides records a different phase of action, and each image has portions of a color value separated through a dark-yellow color filter.

6. The method which comprises recording on successive image areas negative color-separated records of successive phases of action, alternate images being of a green color selected value, the other images being of a red color selected value, and each image having a portion of a color value separated through a dark-yellow color filter.

7. A method which comprises recording upon a negative color-separated images of successive phases of action characterized thereby that the first and last portions of the exposure of each successive phase of action of each image is made through a dark yellow.

8. As an article of manufacture, a double-coated projecting-positive carrying on opposite sides pairs of images, the images of each pair representing two successive phases of action, the two images of each pair lying on opposite sides of the film and in registry with each other, the color values of both images being substantially complementary throughout the major portions of the areas thereof but having edge portions of common color selected value in both picture areas.

9. As an article of manufacture, a double coated color projecting-positive, carrying in superposed relation on opposite sides, color separated images of two successive phases of action, one on each side, the overlapping images each having portions in superposed relation of complementary color selected value and portions not in superposed relation of one and the same substantially intermediate color selected value.

10. As an article of manufacture, a motion picture positive bearing superposed images representing successive phases of action, superposed images being generally of complementary color selected values, but having edge portions of non-complementary color selected value, such latter color selection being of one color intermediate the complementary colors.

11. As an article of manufacture, a negative having successive images of color selected value and in each negative the major portions of alternate images are separated in color values complementary to each other, said images having also portions of color selected value of one and the same color substantially intermediate the complementary colors.

In testimony whereof, I have signed my name to this specification this 18th day of October, 1920.

JOSEPH SHAW.